United States Patent Office.

JOHN F. SIEBENMANN, OF MILWAUKEE, WISCONSIN.

Letters Patent No. 74,946, dated February 25, 1868.

IMPROVED ARTIFICIAL WINE.

The Schedule referred to in these Letters Patent and making part of the same.

TO ALL WHOM IT MAY CONCERN:

Be it known that I, JOHN F. SIEBENMANN, of Milwaukee, in the county of Milwaukee, and State of Wisconsin, have invented certain new and useful Improvements in the Manufacture of Artificial Wine; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in the production of an artificial wine, by the use of the ingredients and the process hereinafter described.

For the production of one hundred gallons, I take a tub of suitable capacity, provided with a cover, and place it on a stand about two feet high. I then put into it, of water, fifty gallons, and raise the temperature of the room to 86° or 90° Fahrenheit, after which I add the following ingredients:

|  | For ordinary quality. | For best quality. |
| --- | --- | --- |
| White sugar, | 95 pounds. | 150 pounds. |
| Pure tartaric acid, | 3 " | 2¼ " |
| Tamarind, | 6 " | 6 " |
| Raisins, | 6 " | 12 " |

The raisins should be severed from the stems, and cut or crushed. Boiling water should then be added until the temperature of the mass is raised from 81° to 90°. The mass should then be well mixed to dissolve the sugar and acid. When dissolved, add six pints of good beer-yeast, for the ordinary quality, or eight and a quarter for the best quality, and mix thoroughly. If wine-yeast can be procured, as it can be after it is once formed, it may be used instead, but double in quantity.

Care should be taken that the temperature does not rise above 90°, nor fall below 81°—86° being suited for the purpose. In about twelve hours the mass will be in fermentation, and at first it should be stirred up about once in twelve hours, but afterwards once in twenty-four hours, until fermentation ceases, which will occur in from ten to fourteen days.

When the fermentation is over, the wine is placed in casks and put into the cellar, where it still ferments for three or four weeks, after which it is ready to be drawn from the casks and purified. In order to give to the wine, especially the best quality, its "bouquet," the following ingredients are added to the mass in the tub, before the yeast is added: Fresh-dried elder-flowers, one ounce; crushed nutmegs, one-half ounce; cut mace, one-quarter ounce; Florentine iris-root, one-half ounce; and one pod of vanilla, also cut.

The color is imparted by the application of the sugar-color, a process well known to those skilled in the art, after the second fermentation is completed and the wine is drawn off. In order to make red wine, fruits or berries are used which give a red color, such as cherries, whortleberries, elderberries, blackberries, &c. These are crushed and added to the mass when fermentation commences.

Wine produced by this process is not only healthful, but can be preserved like any natural wine, and can be produced at an extremely low cost.

Having thus described my invention, what I claim, is—

The production of wine from the ingredients, and by the process, substantially as herein described.

JOHN F. SIEBENMANN.

Witnesses:
 FRED. RIETBROCK,
 L. A. GRAVELUND,